United States Patent
Takemoto et al.

(10) Patent No.: US 10,258,875 B2
(45) Date of Patent: Apr. 16, 2019

(54) NON-TRANSITORY STORAGE MEDIUM ENCODED WITH COMPUTER READABLE GAME PROGRAM, INFORMATION PROCESSING APPARATUS, INFORMATION PROCESSING SYSTEM, AND GAME PROCESSING METHOD

(71) Applicant: NINTENDO CO., LTD., Kyoto-shi, Kyoto (JP)

(72) Inventors: Masataka Takemoto, Kyoto (JP); Aya Kyogoku, Kyoto (JP); Taiju Suzuki, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 539 days.

(21) Appl. No.: 14/990,275

(22) Filed: Jan. 7, 2016

(65) Prior Publication Data

US 2017/0087461 A1    Mar. 30, 2017

(30) Foreign Application Priority Data

Sep. 30, 2015   (JP) .................. 2015-193211

(51) Int. Cl.
| | |
|---|---|
| *A63F 13/235* | (2014.01) |
| *A63F 13/45* | (2014.01) |
| *G06K 7/10* | (2006.01) |
| *A63F 13/22* | (2014.01) |
| *A63F 13/79* | (2014.01) |
| *A63F 13/21* | (2014.01) |
| *A63F 13/56* | (2014.01) |
| *A63F 13/35* | (2014.01) |

(Continued)

(52) U.S. Cl.
CPC ............ *A63F 13/235* (2014.09); *A63F 13/21* (2014.09); *A63F 13/22* (2014.09); *A63F 13/35* (2014.09); *A63F 13/45* (2014.09); *A63F 13/56* (2014.09); *A63F 13/79* (2014.09); *A63F 13/95* (2014.09); *G06K 7/10* (2013.01); *H04W 4/80* (2018.02)

(58) Field of Classification Search
CPC ........ H04W 4/80; G06K 7/10; H04L 67/1097
See application file for complete search history.

(56) References Cited

U.S. PATENT DOCUMENTS

| | | | | |
|---|---|---|---|---|
| 2012/0077593 | A1* | 3/2012 | Sarmenta | ............ A63F 3/00643 463/40 |
| 2013/0324045 | A1* | 12/2013 | Shimohata | ............ A63F 13/327 3/327 |

(Continued)

FOREIGN PATENT DOCUMENTS

JP    2009-006004    1/2009

*Primary Examiner* — Robert T Clarke, Jr.
(74) *Attorney, Agent, or Firm* — Nixon & Vanderhye P.C.

(57) ABSTRACT

A non-transitory storage medium encoded with a computer readable game program executed by a computer incorporating a near field radio communication function causes the computer to perform acts including reading, by establishing near field radio communication with an information storage medium, first data stored in that information storage medium, registering the read first data, reading, by establishing near field radio communication with an information storage medium after registration of the first data, second data stored in that information storage medium, and progressing game processing when the second data matches with the first data.

17 Claims, 12 Drawing Sheets

(51) Int. Cl.
*A63F 13/95* (2014.01)
*H04W 4/80* (2018.01)

(56) References Cited

U.S. PATENT DOCUMENTS

| | | | | |
|---|---|---|---|---|
| 2013/0324262 A1* | 12/2013 | Shimohata | ............ | H04W 4/008 463/42 |
| 2014/0256430 A1* | 9/2014 | Matsumura | ............. | A63F 13/10 463/31 |
| 2016/0030848 A1* | 2/2016 | Lema | ........................ | A63F 9/24 463/9 |

* cited by examiner

CHARACTER1

CHARACTER2

CHARACTER3

CHARACTER4

FIG.10

200A1
- RF TAG ID : W6UB2C4D — 251
- CHARACTER CODE : 0002 — 252
- RF TAG TYPE : 01 — 253
- ADDITIONAL CODE : 00 — 254

200A2
- RF TAG ID : L4TXCNYP — 251
- CHARACTER CODE : 0004 — 252
- RF TAG TYPE : 01 — 253
- ADDITIONAL CODE : 00 — 254

200B1
- RF TAG ID : A9KR3EB8 — 251
- CHARACTER CODE : 0010 — 252
- RF TAG TYPE : 02 — 253
- ADDITIONAL CODE : 05 — 254

200B2
- RF TAG ID : Q84JEUGP — 251
- CHARACTER CODE : 0020 — 252
- RF TAG TYPE : 02 — 253
- ADDITIONAL CODE : 01 — 254

FIG.11A

| | 261 | 262 | 270 |
|---|---|---|---|
| | PLAYER1 | 0002 | |
| | PLAYER2 | 0004 | |
| | ⋮ | ⋮ | |

FIG.11B

| 281 | 282 | 283 | 280 |
|---|---|---|---|
| PLAYER1 | W6UB2C4D | 0002 | |
| PLAYER2 | L4TXCNYP | 0004 | |
| ⋮ | ⋮ | ⋮ | |

NON-TRANSITORY STORAGE MEDIUM ENCODED WITH COMPUTER READABLE GAME PROGRAM, INFORMATION PROCESSING APPARATUS, INFORMATION PROCESSING SYSTEM, AND GAME PROCESSING METHOD

This nonprovisional application is based on Japanese Patent Application No. 2015-193211 filed with the Japan Patent Office on Sep. 30, 2015, the entire contents of which are hereby incorporated by reference.

FIELD

The present technology relates to a non-transitory storage medium encoded with a computer readable game program making use of near field radio communication, an information processing apparatus, an information processing system, and a game processing method.

BACKGROUND AND SUMMARY

Various applications making use of near field radio communication have been put into practical use. In general applications, with reading of some information from a radio frequency (RF) tag serving as a trigger, predetermined processing is performed.

In the prior technique as described above, information stored in an RF tag has been read and processing reflecting the read information has merely been performed.

A game program bringing about new user experiences when one player or a plurality of players use(s) a plurality of RF tags to progress game processing has been demanded.

An exemplary embodiment provides a non-transitory storage medium encoded with a computer readable game program executed by a computer incorporating a near field radio communication function, and the game program causes the computer to perform the following acts. The acts include reading, by establishing near field radio communication with an information storage medium, first data stored in that information storage medium, registering the read first data, reading, by establishing near field radio communication with an information storage medium after registration of the first data, second data stored in that information storage medium, and progressing game processing when the second data matches with the first data.

The step of progressing game processing may include not progressing the game processing when the second data does not match with the first data.

There may be a plurality of types of information storage medium from which data is read through near field radio communication.

The step of progressing game processing may include not progressing the game processing when the type of the information storage medium from which the second data has been read is identical to the type of the information storage medium from which the first data has been read and when the second data does not match with the first data.

The step of progressing game processing may include progressing the game processing even when the second data does not match with the first data when the type of the information storage medium from which the second data has been read is different from the type of the information storage medium from which the first data has been read.

The step of progressing game processing may include progressing the game processing under a first game rule when the type of the information storage medium from which the second data has been read is identical to the type of the information storage medium from which the first data has been read and progressing the game processing under a second game rule when the type of the information storage medium from which the second data has been read is different from the type of the information storage medium from which the first data has been read.

The step of registering the first data may include registering a plurality of pieces of the first data.

The step of registering the first data may include registering the plurality of pieces of the first data in association with respective specific players.

The step of progressing game processing may include comparing one piece of first data selected in a predetermined order from among the plurality of pieces of the registered first data with the second data.

The step of registering the first data may include registering the first data in association with a specific character.

The step of progressing game processing may include controlling a character associated with the first data.

The information storage medium may be formed in a shape representing any character. The step of progressing game processing may include controlling a character corresponding to a shape represented by the information storage medium from which the first data has been read.

The step of controlling a character may include displaying the character in a game space.

The step of controlling a character may include moving the character in a game space.

The step of reading second data may include activating data reading from the information storage medium while a character associated with any registered first data is displayed.

The step of reading second data may include activating data reading from the information storage medium while a character associated with any registered first data is controllable.

An exemplary embodiment provides an information processing apparatus that includes a communication module that exchanges data with an information storage medium by establishing near field radio communication with the information storage medium, a first reading module that reads, by establishing near field radio communication with an information storage medium, first data stored in that information storage medium, a registration module that registers the first data read by the first reading module, a second reading module that reads, by establishing near field radio communication with an information storage medium after registration of the first data, second data stored in that information storage medium, and a process progress module that progresses game processing when the second data matches with the first data.

An exemplary embodiment provides an information processing system that includes a communication module that exchanges data with an information storage medium by establishing near field radio communication with the information storage medium and a processing module. The processing module performs acts by executing a game program. The acts include reading, by establishing near field radio communication with an information storage medium, first data stored in that information storage medium, registering the read first data, reading, by establishing near field radio communication with an information storage medium after registration of the first data, second data stored in that information storage medium, and progressing game processing when the second data matches with the first data.

An exemplary embodiment provides a game processing method performed by a computer incorporating a near field radio communication function. The game processing method includes reading, by establishing near field radio communication with an information storage medium, first data stored in that information storage medium, registering the read first data, reading, by establishing near field radio communication with an information storage medium after registration of the first data, second data stored in that information storage medium by establishing near field radio communication with the information storage medium after registration of the first data, and progressing game processing when the second data matches with the first data.

The foregoing and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 10 shows an exemplary illustrative non-limiting drawing illustrating one example of a data structure made use of in the information processing apparatus according to the present embodiment.

FIGS. 11A and 11B each show an exemplary illustrative non-limiting drawing illustrating one example of a result of registration of a character generated in the information processing apparatus according to the present embodiment.

DETAILED DESCRIPTION OF NON-LIMITING EXAMPLE EMBODIMENTS

Figure 1:
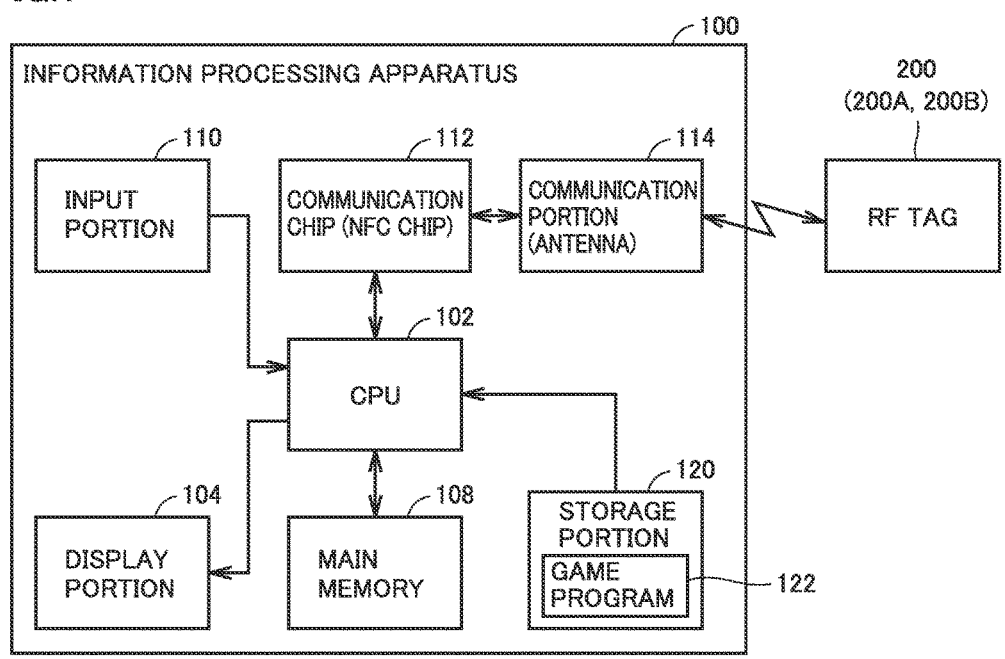
FIG. 1 shows an exemplary illustrative non-limiting drawing illustrating a configuration example of an information processing apparatus according to the present embodiment.

The present embodiment will be described in detail with reference to the drawings. The same or corresponding elements in the drawings have the same reference characters allotted and description thereof will not be repeated.

A game program according to the present embodiment is executed by an information processing apparatus representing a computer incorporating a near field radio communication function. In the present embodiment, communication under near field radio communication (NFC) specifications will be described by way of example of near field radio communication between an information processing apparatus and an RF tag. "Near field radio communication" herein refers to a communication scheme in which radio waves (for example, electromagnetic induction) from one apparatus generate electromotive force in the other apparatus by way of example. The other apparatus can operate with generated electromotive force (the other apparatus may or may not have a power supply).

In near field radio communication, communication can be established when an information processing apparatus and an RF tag are proximate to each other (typically, a distance therebetween is not greater then ten and several centimeters). In near field radio communication, sending of radio waves continues while communication between two communication apparatuses is maintained (while another tag is proximate to a communication apparatus). Though a scheme of communication through radio waves is described by way of example, limitation thereto is not particularly intended. Optical communication or communication via other media may be applicable and a scheme is not limited.

[A. Hardware Configuration of Information Processing Apparatus]

A hardware configuration of an information processing apparatus according to the present embodiment will initially be described. A configuration in which the information processing apparatus according to the present embodiment is mounted as a game device will be described by way of example.

Referring to FIG. 1, an information processing apparatus 100 is any computer incorporating a near field radio communication function for exchanging data with an RF tag 200 representing one example of an information storage medium. Information processing apparatus 100 may be, for example, a portable (also referred to as mobile) device such as a portable game device, a portable telephone, or a smartphone, a stationary device such as a personal computer or a home game console, or a large apparatus such as an arcade game machine. For example, information processing apparatus 100 may be a portable device having an NFC reader and writer function.

RF tag 200 is any device which can establish near field radio communication with information processing apparatus 100. In the present embodiment, RF tag 200 is an information storage medium having a function as an NFC tag. RF tag 200 is a radio frequency identification (RFID) including a circuit which can read from and write into a storage component, and has a circuit (an IC chip) establishing near field radio communication and a storage component for storing data (such as a memory). RF tag 200 may be a device having only a function to store data (an RF tag), or may be, for example, an information processing apparatus (a portable device) having an NFC card emulation function.

Overview of a hardware configuration of information processing apparatus 100 will be described below. As shown in FIG. 1, information processing apparatus 100 has a communication portion 114. Communication portion 114 is implemented by an antenna used for near field radio communication. Information processing apparatus 100 has a communication chip 112. Communication chip 112 generates data (radio waves/signals) to be sent from communication portion 114 in response to an instruction from a central processing unit (CPU) 102 which will be described later. Generated data is sent from communication portion 114. Communication chip 112 is implemented, for example, by an NFC chip. As CPU 102 executes a game program 122, communication portion 114 and communication chip 112 function as a communication module which exchanges data with an information storage medium by establishing near field radio communication with the information storage medium.

As shown in FIG. 1, information processing apparatus 100 includes CPU 102 and a main memory 108. CPU 102 is an information processing portion for performing various types of information processing performed in information processing apparatus 100. CPU 102 performs various types of information processing by interacting with main memory 108.

Information processing apparatus 100 has a storage portion 120. Storage portion 120 stores various programs (which may include an operating system and a communication program in addition to game program 122) executed in information processing apparatus 100. Storage portion 120 is implemented by any storage device (a storage medium) which can be accessed by CPU 102. Storage portion 120 may be implemented by a storage portion contained in information processing apparatus 100 such as a hard disk or a memory, a storage medium attachable to or removable from information processing apparatus 100 such as an optical disk or a cartridge, or both of the storage portion and the storage medium. In such a case, a game system representing one example of an information processing system including information processing apparatus 100 and any storage medium may be implemented.

A communication program stored in storage portion 120 includes computer readable instructions for implementing data communication with RF tag 200. For example, the communication program is firmware for operating communication chip 112 and may be prepared in advance in information processing apparatus 100 as a library. The communication program has communication chip 112 perform an operation for communication in response to a command from an application. When a plurality of application programs are executable in information processing apparatus 100, the communication program may be used commonly among applications.

Game program 122 includes computer readable instructions for implementing game processing as will be described later by using data read from RF tag 200.

The communication program and game program 122 may be mounted integrally as an information processing program or mounted separately from each other.

Information processing apparatus 100 has an input portion 110 implemented as a button or a touch panel and accepting an instruction from a user. Information processing apparatus 100 has a display portion 104 for displaying an image generated through information processing.

Information processing apparatus 100 may be implemented by a plurality of apparatuses. For example, information processing apparatus 100 may be configured in such a manner that an apparatus including communication portion 114 and communication chip 112 is removably connected to an apparatus including CPU 102 and main memory 108. Information processing apparatus 100 may be implemented by a main body apparatus having CPU 102 and an apparatus having input portion 110 and/or display portion 104 which are separate from each other. For example, in another embodiment, information processing apparatus 100 may be implemented by a main body apparatus and a terminal apparatus having input portion 110 and display portion 104, or by a main body apparatus and an operation apparatus having input portion 110. Information processing apparatus 100 may employ a television as a display apparatus, without including display portion 104.

In another embodiment, at least a part of information processing performed in information processing apparatus 100 may be performed as distributed among a plurality of apparatuses capable of communicating over a network (a wide area network and/or a local network).

[B. Overview of Game Processing]

Overview of game processing provided as game program 122 according to the present embodiment is executed will now be described. Game program 122 according to the present embodiment provides a kind of a board game in which a plurality of players can participate. The plurality of players may be constituted of one real player and virtual players provided on a computer.

More specifically, in the board game provided by game program 122, such game processing is performed that a plurality of players perform some operations in rotation in a predetermined order, a character associated with each player moves forward in accordance with a result of the operation, and a player who satisfies a predetermined condition wins. Typically, game program 122 according to the present embodiment virtually provides a kind of sugoroku game. The predetermined condition includes reaching the goal earliest and gaining points up to a predetermined value.

In the game processing according to the present embodiment, RF tag 200 is used to register a character to be operated in a game space and to perform an operation at each turn of a player. Namely, information processing apparatus 100 progresses the game processing by reading data stored in RF tag 200 by establishing near field radio communication with RF tag 200 representing one example of the information storage medium.

In the present embodiment, a plurality of types of RF tags 200 are prepared. Namely, there are a plurality of types of RF tags 200 (information storage media) from which information processing apparatus 100 reads data through near field radio communication. Any RF tag may be adopted so long as RF tags can be categorized into a plurality of types in any sense. By way of example, in the present embodiment, a figure type RF tag and a card type RF tag are adopted. A stick type or pen type RF tag may be adopted in addition to the aforementioned type.

Figure 2:
FIG. 2 shows an exemplary illustrative non-limiting drawing illustrating one example of an RF tag of a figure type used in the information processing apparatus according to the present embodiment.
Figure 2:
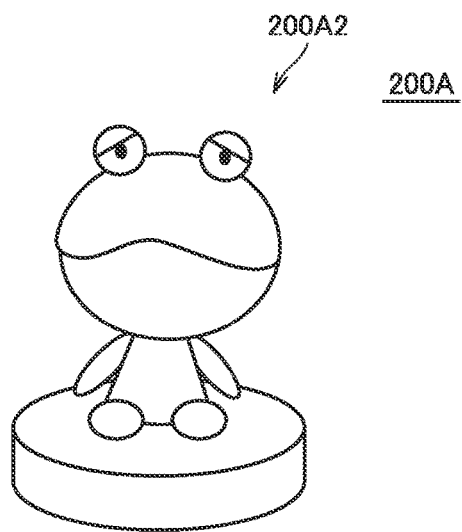
Figure 3:
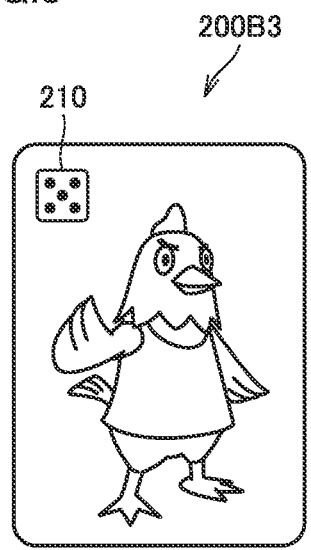
FIG. 3 shows an exemplary illustrative non-limiting drawing illustrating an RF tag of a card type used in the information processing apparatus according to the present embodiment.
Figure 3:
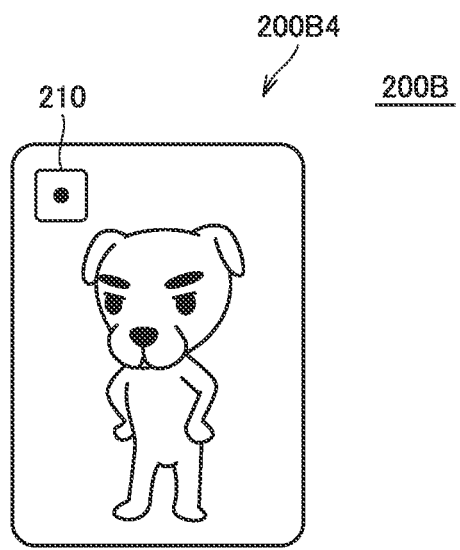

As shown in FIGS. 2 and 3, any of RF tags 200A and 200B is associated with a character which appears in a game space. RF tag 200A of the figure type shown in FIG. 2 is formed in a shape representing an associated character, and RF tag 200B of a card type shown in FIG. 3 has an associated character depicted on a surface thereof. As will be described later, each of RF tags 200A and 200B holds identification information representing the associated character and information processing apparatus 100 can specify the associated character by reading the identification information.

Attribute information 210 in accordance with the depicted character is provided to RF tag 200B of the card type shown in FIG. 3. For example, an image showing a pip of a dice is used as attribute information 210. How to use this attribute information 210 will be described later.

For the sake of convenience of description, as shown in FIG. 2, an RF tag of a figure type having a shape representing a character 1 is denoted as an RF tag 200A1 and an RF tag of a figure type having a shape representing a character 2 is denoted as an RF tag 200A2. As shown in FIG. 3, an RF tag of a card type having a character 3 depicted is denoted as an RF tag 200B3 and an RF tag of a card type having a character 4 depicted is denoted as an RF tag 200B4.

In the game processing according to the present embodiment, RF tag 200A of the figure type is used for each player to progress normal game processing, and RF tag 200B of the card type is used for performing specific processing during the game processing.

In the present embodiment, each player uses any RF tag 200A of the figure type for an operation of a corresponding character. More specifically, each player registers in advance any RF tag 200A, and a plurality of players each hold RF tag 200A, which has been used for registration, over a prescribed position in information processing apparatus 100 in rotation. The game processing proceeds through such a series of processes.

RF tag 200B of the card type can allow game processing to progress under a game rule different from a normal condition, in a chance or clutch situation in the game processing. The game rule different from the normal condition may include, for example, processing for advantageously or disadvantageously changing a probability of an event which will occur for a specific player in determining such a probability. Alternatively, it may be processing for changing an event candidate which may occur advantageously or disadvantageously for a specific player.

Therefore, even when one player has a plurality of RF tags 200A of the figure type, the player can use only one RF tag 200A registered first during the game processing. One RF tag 200B of the card type or a plurality of RF tags 200B may be made use of depending on a situation. In single game processing, conditions for or restrictions on the number, a type, and the total number of times of use, of RF tags 200B which can be made use of may statically or dynamically be determined in accordance with a predetermined game rule, a situation of game progress, and results of a game in the past.

[C. Screen Representation Example and Operation Example of Game Processing]

A screen representation example and an operation example of game processing provided as a result of execution of game program 122 according to the present embodiment will now be described.

FIGS. 4, 5A, 5B, 6A, 6B, 7A, and 7B each show an example in which game processing is progressed by four players (a player 1 to a player 4). Player 1 registers character 1 (RF tag 200A1) shown in FIG. 2 as a character representing player 1 himself/herself, and player 2 registers character 2 (RF tag 200A2) shown in FIG. 2 as a character representing player 2 himself/herself.

As shown in FIGS. 4, 5A, 5B, 6A, 6B, 7A, and 7B, a travelable point group 320 is defined along a prescribed path in a game space 300, and characters 301 to 304 registered by player 1 to player 4, respectively, are arranged.

Figure 4:
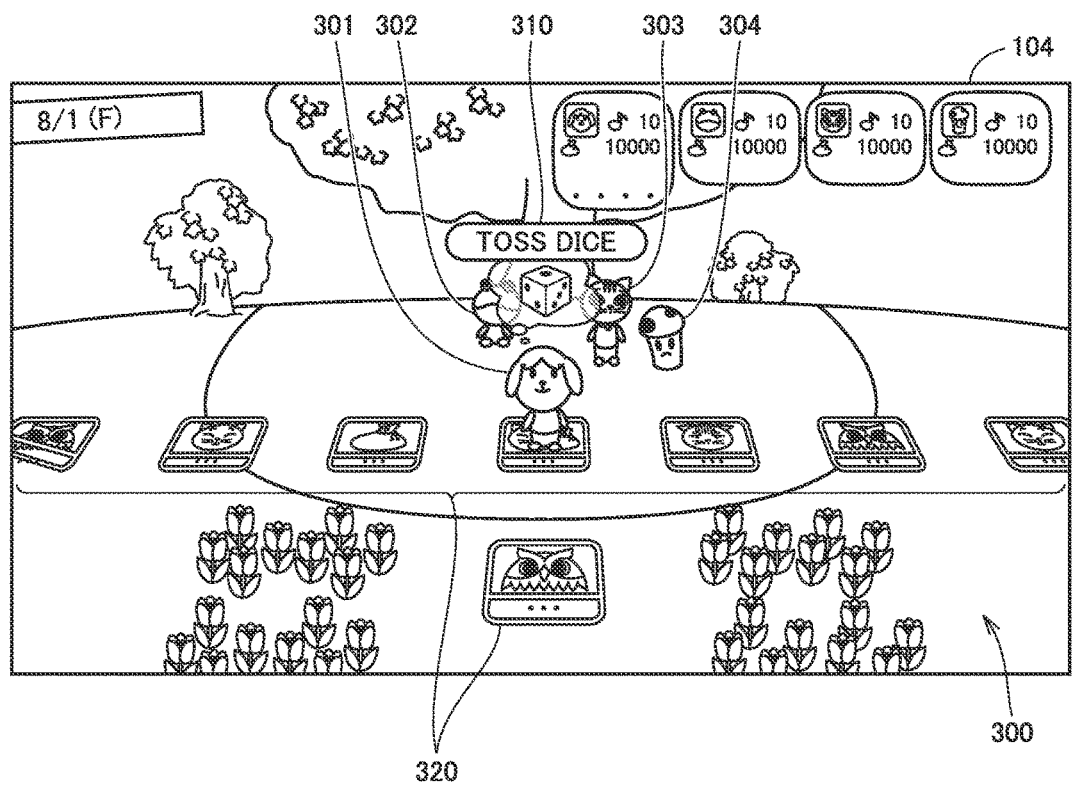
FIG. 4 shows an exemplary illustrative non-limiting drawing illustrating a representation example of a case that a turn to operate has come to a player 1 in game processing provided by a game program according to the present embodiment.

FIG. 4 shows a state that a turn to operate has come to player 1. As shown in FIG. 4, a character 301 is represented in the center and a notification object 310 including an image of a dice and a message "toss dice" is represented in the vicinity of character 301. As this notification object 310 is represented, reading of RF tag 200 in information processing apparatus 100 is activated.

Figure 5A:
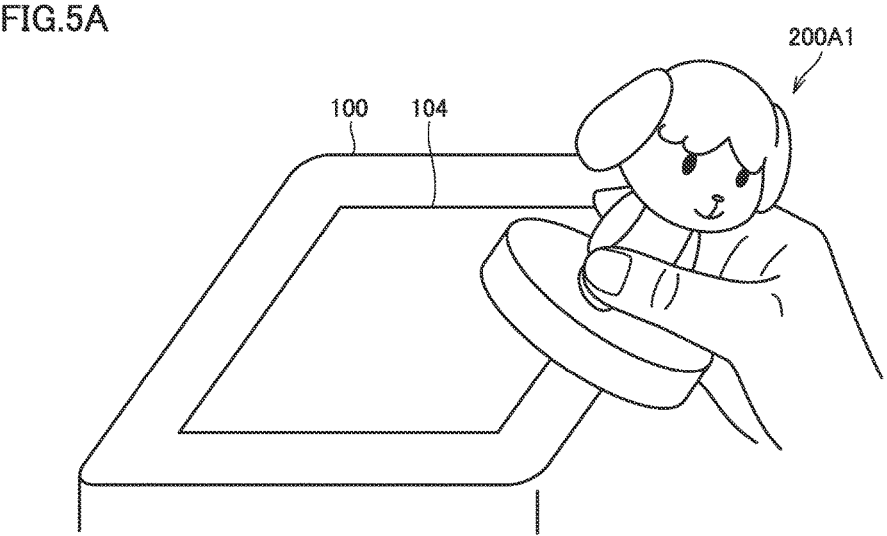
FIGS. 5A and 5B each show an exemplary illustrative non-limiting drawing illustrating an example of an operation by player 1 in the game processing provided by the game program according to the present embodiment.
Figure 5B:
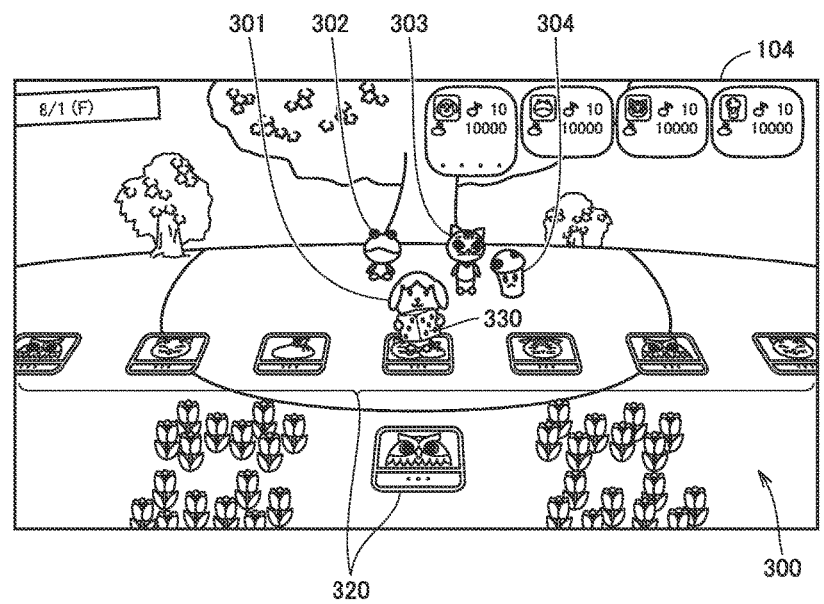

In a state shown in FIG. 4, when player 1 holds RF tag 200A1 registered in advance over the information processing apparatus as shown in FIG. 5A, the game processing progresses. More specifically, as RF tag 200A1 is held over information processing apparatus 100, character 301 operated by player 1 tosses a dice 330 as shown in FIG. 5B, and character 301 moves to any position in travelable point group 320 in accordance with the pip of dice 330. For example, some attribute is allocated to each travelable point group 320, and processing in accordance with the attribute allocated to a travelable point at a travel destination of character 301 is performed. For example, a point is allocated to a travelable point randomly or under a prescribed rule, and the allocated point may be added to a corresponding player.

As shown in FIGS. 4, 5A, and 5B, when a turn to operate comes to player 1, character 301 operated by player 1 is arranged in front of other characters 302 to 304. Namely, character 301 which is being operated is more conspicuous as being represented to be larger in size than other characters.

Figure 6A:
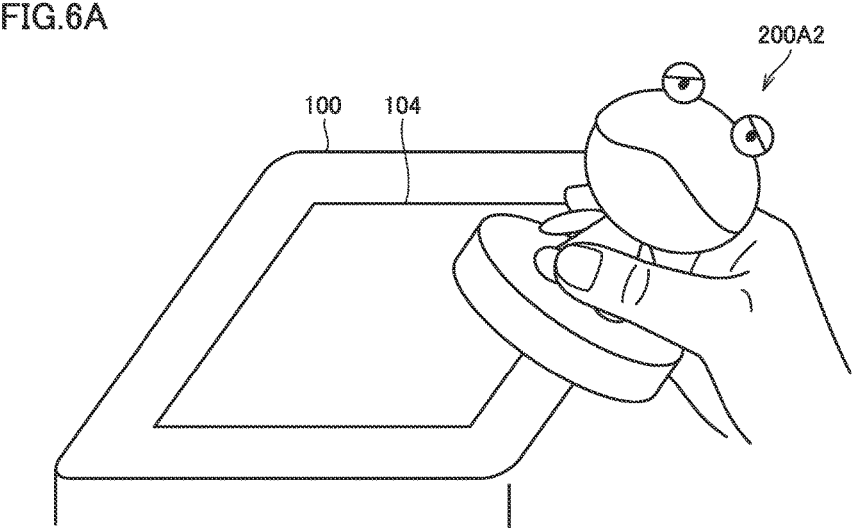
FIGS. 6A and 6B each show an exemplary illustrative non-limiting drawing illustrating an example of an operation by a player 2 in the game processing provided by the game program according to the present embodiment.
Figure 6B:
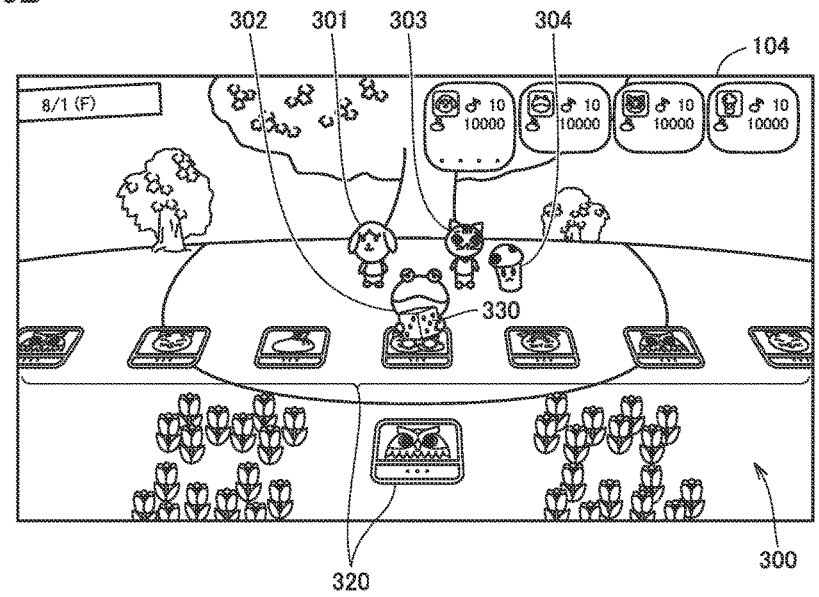

When the operation by player 1 ends, a turn to operate comes to player 2. In this case as well, as in FIG. 4, character 302 is represented in the center and notification object 310 is represented in the vicinity of character 302. Then, reading of RF tag 200 in information processing apparatus 100 is activated. In such a state, when player 2 holds RF tag 200A2 registered in advance over the information processing apparatus as shown in FIG. 6A, game processing progresses. More specifically, when RF tag 200A2 is held over information processing apparatus 100, character 302 operated by player 2 tosses dice 330 as shown in FIG. 6B and character 302 moves to any position in travelable point group 320 in accordance with a pip of the dice.

Similar game processing is repeated for player 3 and player 4.

As shown in FIG. 4, reading from RF tag 200 by information processing apparatus 100 may be activated while a character associated with any data registered in advance is represented. In other words, reading from RF tag 200 by information processing apparatus 100 may be activated while a character associated with any data registered in advance is controllable. By thus restricting a period during which reading is activated, an erroneous operation can be prevented and power saving in a reading function can be achieved.

In the game processing shown in FIGS. 4, 5A, 5B, 6A, and 6B, for example, when a turn to operate comes to player 1, game processing, that is, processing for a corresponding character to toss a dice and to move, is not performed even though RF tag 200A different from RF tag 200A registered in association with player 1 is held over information processing apparatus 100. Thus, in the game processing according to the present embodiment, holding specific RF tag 200A registered in advance for each player over the information processing apparatus is a condition for progressing the game processing.

Figure 7A:
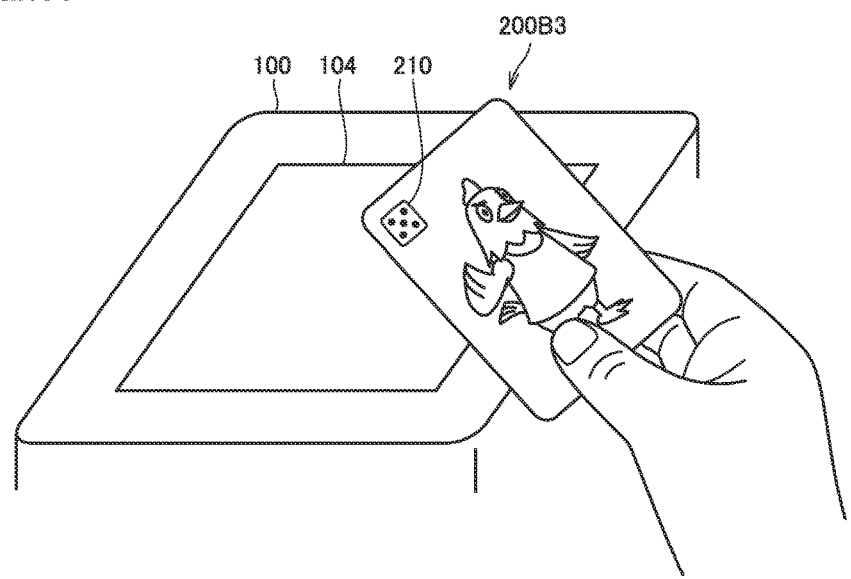
FIGS. 7A and 7B each show an exemplary illustrative non-limiting drawing illustrating another example of an operation by player 1 in the game processing provided by the game program according to the present embodiment.
Figure 7B:
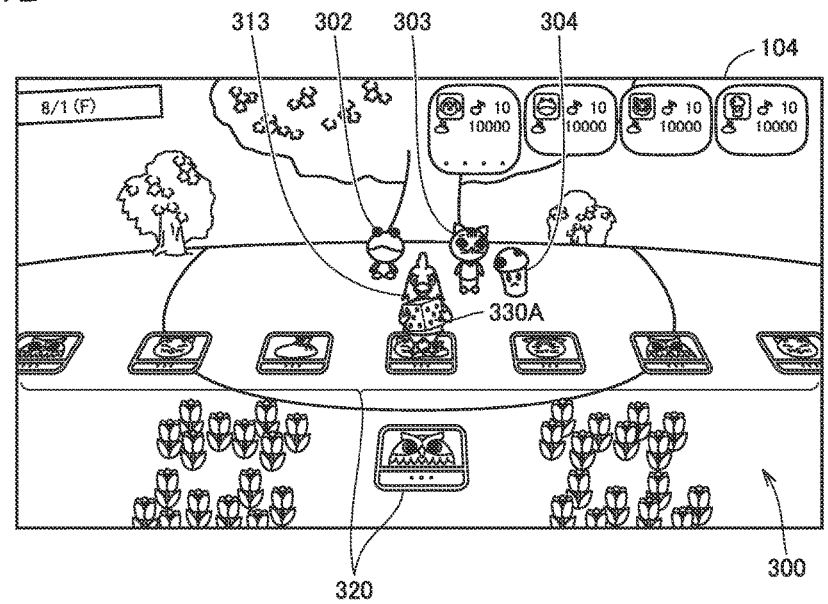

Each player 1 can use RF tag 200B of the card type instead of RF tag 200A of the figure type registered in advance. For example, in the state as shown in FIG. 4, when player 1 holds RF tag 200B of the card type different from RF tag 200A1 registered in advance over the information processing apparatus as shown in FIG. 7A, a character 313 depicted on RF tag 200B of the card type which has been held over information processing apparatus 100 appears in game space 300 instead of character 301, character 313 tosses a dice 330A, and a character 313 moves to any position in travelable point group 320 in accordance with a pip of the dice.

Here, game processing progresses under a game rule different from a normal condition. In the example shown in FIG. 7B, arrangement of pips of the dice tossed by character 313 is set differently from arrangement of pips of a regular dice. More specifically, dice 330A is changed to more likely to show a pip included in attribute information 210 (see FIG. 3) provided to RF tag 200B of the card type which has been held over the information processing apparatus. For example, three faces of six faces of the dice show a pip depicted on RF tag 200B (in the example shown in FIG. 7A, "5"). By thus adopting dice 330A of which arrangement of the pips has been changed, "5" is shown at 3/6 (50%).

Thus, since a probability of showing of a specific pip increases by holding RF tag 200B of the card type over the information processing apparatus, a player can more advantageously progress the game by holding over the information processing apparatus, RF tag 200B on which a specifically desired pip is depicted among RF tags 200B of the card type which the player has in a scene that the player desires to show a specific pip depending on a situation of progress of the game.

As described above, in the game processing according to the present embodiment, RF tag 200A of the figure type which has been registered in advance and RF tag 200B of the card type which is held over the information processing apparatus in accordance with a situation of game progress are selectively used. Each player can enjoy tactics in the board game based on selective use of such a plurality of types of RF tags.

[D. Processing Procedure in Game Processing]

A processing procedure in game processing provided as a result of execution of game program 122 according to the present embodiment will now be described.

Figure 8:
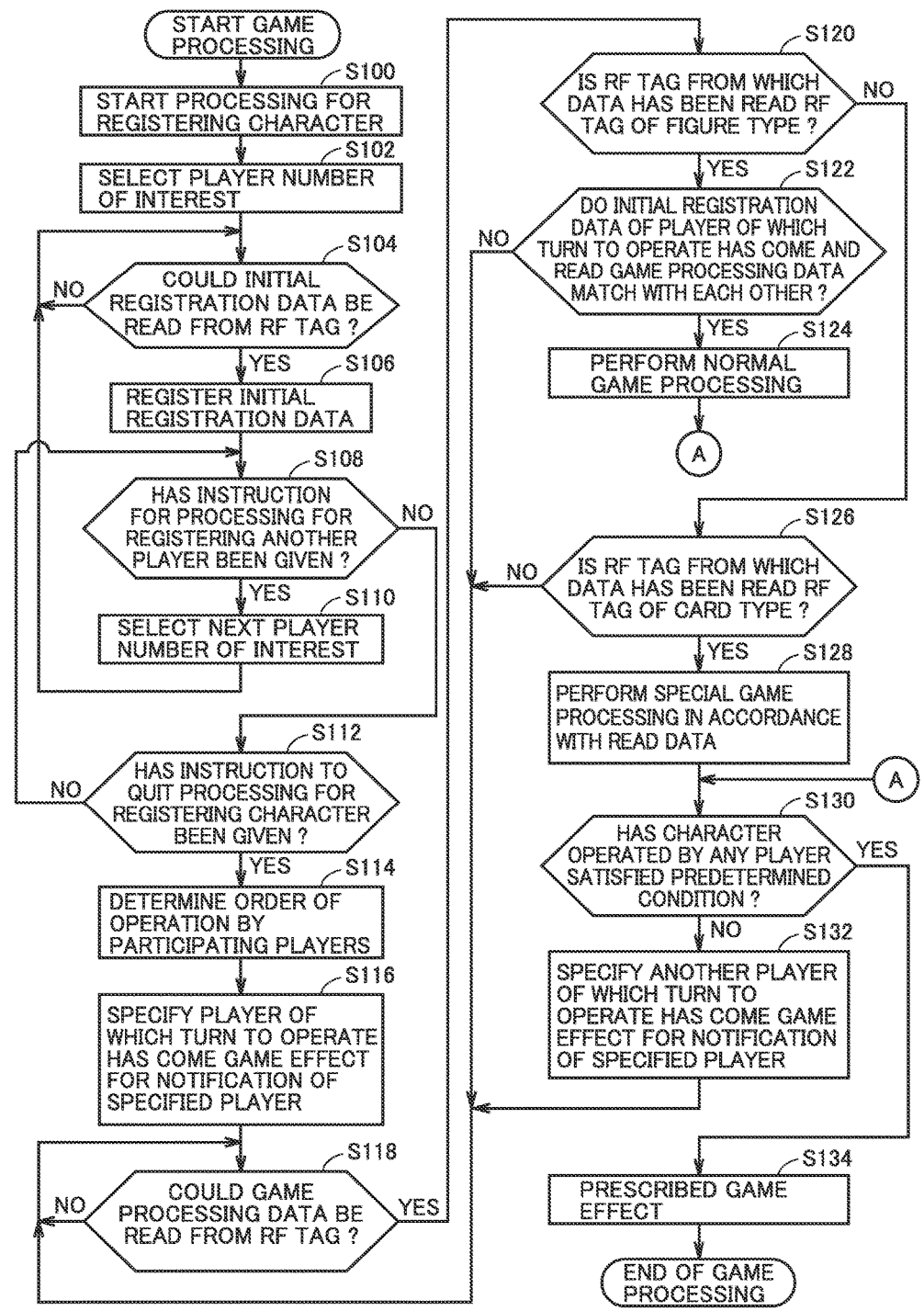
FIG. 8 shows an exemplary illustrative non-limiting drawing illustrating a flowchart showing a procedure in the game processing provided by the game program according to the present embodiment.

Each step shown in FIG. 8 is implemented as CPU 102 of information processing apparatus 100 executes game program 122.

Referring to FIG. 8, when the game processing is started, CPU 102 starts processing for registering a character (step S100). When the processing for registering the character is started, a near field radio communication function is activated. Namely, communication chip 112 and communication portion 114 (see FIG. 1) are activated to start to emit radio waves for reading data from RF tag 200A.

In succession, CPU 102 selects a number of a player for which processing for registering a character is to be performed (step S102) and determines whether or not data (hereinafter also referred to as "initial registration data" for distinction) could be read from any RF tag 200A (step S104). When initial registration data cannot be read from any RF tag 200A (NO in step S104), the processing in step S104 is repeated.

In the present embodiment, only RF tag 200A of the figure type is used for registration of a character. Therefore, even though some data could be read from RF tag 200B of the card type in step S104, the read data may by discarded as being invalid. Namely, even though some data is read from RF tag 200B, it may be determined that initial registration data cannot be read (NO in step S104) and the processing in step S104 may be repeated.

When initial registration data could be read from any RF tag 200A (YES in step S104), CPU 102 has the read initial registration data registered (step S106). This initial registration data is registered in association with a selected player number. Details of character registration processing and initial registration data will be described later.

Thus, CPU 102 (information processing apparatus 100) reads initial registration data stored in RF tag 200A representing an information storage medium by establishing near field radio communication with RF tag 200A. Then, CPU 102 (information processing apparatus 100) has the read initial registration data registered.

In succession, CPU 102 determines whether or not registration processing for another player has been indicated (step S108). When the registration processing for another player has been indicated (YES in step S108), a number of a next player for which character registration processing is to be performed is selected (step S110) and the processing in step S104 and subsequent steps is repeated.

In contrast, when registration processing for another player has not been indicated (NO in step S108), CPU 102 determines whether or not end of the character registration processing has been indicated (step S112). When end of the character registration processing has not been indicated (NO in step S112), processing in step S108 and subsequent steps is repeated.

When end of the character registration processing has been indicated (YES in step S112), game progress of the board game is started. When the character registration processing ends, the near field radio communication function may once be inactivated.

More specifically, CPU 102 determines an order of operation by participating players (step S14). In succession, CPU 102 specifies a player of which turn to operate has come in accordance with the determined order (that is, a turn to operate has come), provides a game effect to give a notification that the turn to operate has come to the specified player (step S116), and activates the near field radio communication function. For example, a game screen as shown in FIG. 4 described above is shown.

Then, CPU 102 determines whether or not data (hereinafter also referred to as "game processing data" for distinction) could be read from any RF tag 200 (step S118). When game processing data could not be read from any RF tag 200 (NO in step S118), processing in step S118 is repeated.

In step S118, reading of data from any of RF tag 200A of the figure type and RF tag 200B of the card type is permitted. Namely, depending on a type of RF tag 200 from which data has been read, processing as follows is selectively performed. Specifically, initially, when game processing data could be read from any RF tag 200 (YES in step S118), CPU 102 determines whether or not a source from which data has been read is RF tag 200A of the figure type (step S120).

When the source from which data has been read is RF tag 200A of the figure type (YES in step S120), CPU 120 determines whether or not data registered in association with the player of which turn to operate has come (initial registration data) matches with the read data (game processing data) (step S122). When the data registered in association with the player of which turn to operate has come does not match with the read data (NO in step S122), reading of the data is determined as invalid and processing in step S118 and subsequent steps is repeated.

In contrast, when the data registered in association with the player of which turn to operate has come matches with the read data (YES in step S122), CPU 102 performs predetermined normal game processing (step S124). Then, the process proceeds to step S130.

Thus, CPU 102 (information processing apparatus 100) reads game processing data stored in RF tag 200A by establishing near field radio communication with RF tag 200A representing the information storage medium after registration of the initial registration data. Then, when the read game processing data matches with the initial registration data, CPU 102 (information processing apparatus 100) allows the game processing to progress. In other words, when RF tag 200A the same as initially registered RF tag 200A is held over the information processing apparatus, game processing progresses. In contrast, when the read game processing data does not match with the initial registration data, CPU 102 (information processing apparatus 100) does not allow the game processing to progress.

When the source from which the data has been read is not RF tag 200A of the figure type (NO in step S120), CPU 102 determines whether or not the source from which the data has been read is RF tag 200B of the card type (step S126). When the source from which the data has been read is not RF tag 200B of the card type either (NO in step S126), reading of the data is determined as invalid and processing in step S118 and subsequent steps is repeated.

In contrast, when the source from which data has been read is RF tag 200B of the card type (YES in step S126), CPU 102 performs special game processing different from the normal game processing in accordance with the read data (step S128). Then, the process proceeds to step S130.

As shown in steps S118 to S128, CPU 102 (information processing apparatus 100) does not allow the game processing to progress when the type of RF tag 200 (information storage medium) from which game processing data has been read is identical to the type of RF tag 200 from which the initial registration data has been read (that is, YES in step S120) and when the game processing data does not match with the initial registration data (that is, NO in step S122). On the other hand, CPU 102 (information processing apparatus 100) allows the game processing to progress even though game processing data does not match with the initial registration data when the type of RF tag 200 (information storage medium) from which game processing data has been read is different from the type of RF tag 200 from which the initial registration data has been read (that is, NO in step S120).

In step S130, CPU 102 determines whether or not a character operated by any player has satisfied a predetermined condition (for example, has reached the goal) (step S130). When no character has satisfied the condition (NO in step S130), another player of which turn to operate has come in accordance with the determined order is specified, a game effect to give a notification that the turn to operate has come to the specified player is provided (step S132), and the near field radio communication function is activated. Then, the processing in step S118 and subsequent steps is repeated.

In contrast, when any character has satisfied the condition (YES in step S130), a prescribed game effect is provided (step S134) and the game processing ends.

[E. Registration Processing]

Contents of processing in the character registration processing (steps S100 to S112 in FIG. 8) will now be described in detail.

Figure 9:
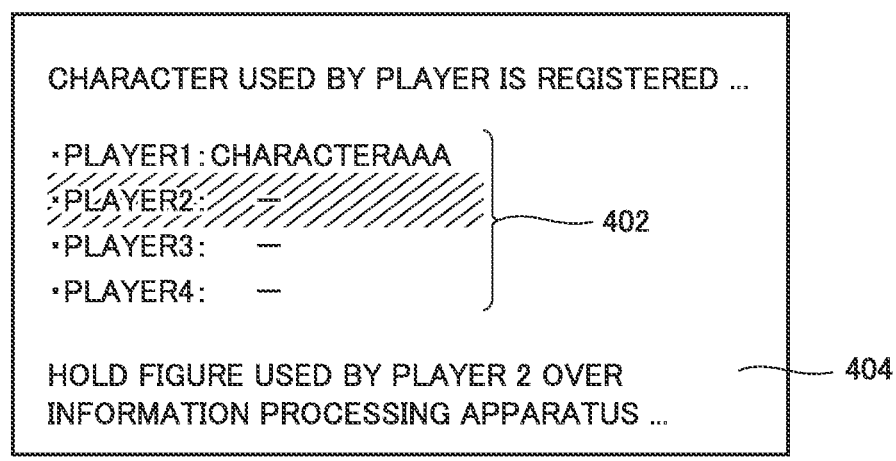
FIG. 9 shows an exemplary illustrative non-limiting drawing illustrating one example of an operation screen in processing for registering a character provided by the game program according to the present embodiment.

When the character registration processing is started, an operation screen 400 as shown in FIG. 9 is shown. In operation screen 400, together with a message indicating processing for registering a character associated with each player, a character associated with each player which has already been registered is displayed in a list (a reference numeral 402) and a message inviting a player to be registered to hold RF tag 200A of the figure type over the information processing apparatus is shown (a reference numeral 404).

As each player who participates in a board game successively holds a character to be used by the player himself/herself (RF tag 200A of the figure type) over information processing apparatus 100 in accordance with such contents of representation on operation screen 400, the character registration processing is performed.

Referring to FIG. 10, each RF tag 200 holds necessary information in accordance with a predetermined format. Specifically, each RF tag 200 typically includes an RF tag ID 251, a character code 252, an RF tag type 253, and an additional code 254 representing additional information. RF tag ID 251 represents identification information specific to RF tag 200. Character code 252 represents identification information representing a character associated with RF tag 200. RF tag type 253 represents identification information representing a type of RF tag 200.

The information shown in FIG. 10 may be stored in a read-only storage area or a readable/writable storage area of RF tag 200.

The identification information stored in RF tag 200 shown in FIG. 10 is read as initial registration data so that a character is registered for each player. Namely, some or the entirety of the initial registration data read from RF tag 200 is registered in association with a specific player.

In a registration result 270 shown in FIG. 11A, a player field 261 and a character code field 262 are brought in correspondence with each other. Each player field 261 stores information for specifying a player of interest, and each character code field 262 stores a corresponding character code. A character associated with each player can be specified by using registration result 270 shown in FIG. 11A.

When registration of the same character by a plurality of players is allowed, a registration result 280 as shown in FIG. 11B may be adopted.

In registration result 280 shown in FIG. 11B, a player field 281, a tag ID field 282, and a character code field 283 are brought in correspondence with one another. Each player field 281 stores information for specifying a player of interest, each tag ID field 282 stores identification information of RF tag 200 used for registration, and each character code field 283 stores a corresponding character code. In addition to a character associated with each player, RF tag 200 used by each player can uniquely be specified by using registration result 280 shown in FIG. 11B.

Thus, in the character registration processing, a plurality of pieces of initial registration data (a character code and an RF tag ID) are registered. In this registration processing, a plurality of pieces of initial registration data are registered in association with specific players, respectively.

In game progress described next, determination as to whether or not RF tag 200 which has been held over the information processing apparatus is identical to registered RF tag 200 is made by referring to the registration result shown in FIG. 11A or 11B. Namely, information processing apparatus 100 compares one piece of initial registration data selected in a predetermined order (that is, initial registration data brought in correspondence with a player of which turn to operate has come) among the plurality of pieces of initial registration data registered during the character registration processing with game processing data read during the game processing.

[F. Game Progress]

As described above, each player can have the game progress by holding RF tag 200A of the figure type or RF tag 200B of the card type over the information processing apparatus.

As RF tag 200A of the figure type is held over the information processing apparatus, the normal game processing progresses. When any RF tag 200A is held over the information processing apparatus while a certain player's turn to operate has come and when the character corresponding to RF tag 200A is identical to the character registered in advance in association with the player, the normal game processing progresses. Namely, the character operated by the player starts an operation to toss a dice.

When registration result 270 shown in FIG. 11A is adopted, a character is registered in association with each player and hence whether or not the character is identical to the registered character is determined. When registration result 280 shown in FIG. 11B is adopted, the character and the identification information for RF tag 200A are registered in association with each player and hence whether or not the identification information is identical to the identification information of registered RF tag 200A is determined.

As described above, in the character registration processing, the initial registration data is registered in association with a specific character, and during progress of the game processing, the character associated with the initial registration data is controlled. During the progress of the game processing, a character corresponding to a shape represented by RF tag 200A of the figure type from which the initial registration data has been read is controlled.

As described with reference to FIGS. 5A, 5B, 6A, 6B, 7A, and 7B, control of a character may include moving a corresponding character in game space 300. Control of a character may include displaying a corresponding character in game space 300 as described with reference to FIG. 4.

In addition to such normal game processing, when RF tag 200B of the card type is held over the information processing apparatus, special game processing is performed. This special game processing can depend on data stored in RF tag 200B of the card type. In the example described above, contents of processing are changed such that a pip of a dice depicted on RF tag 200B is shown at a high probability.

Figure 12A:
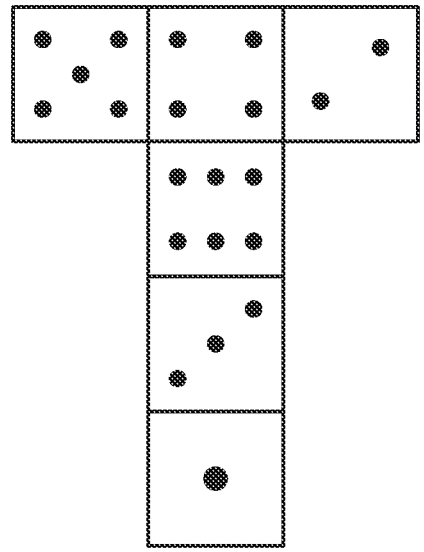
FIGS. 12A and 12B each show an exemplary illustrative non-limiting drawing illustrating special game processing provided by the game program according to the present embodiment.
Figure 12B:
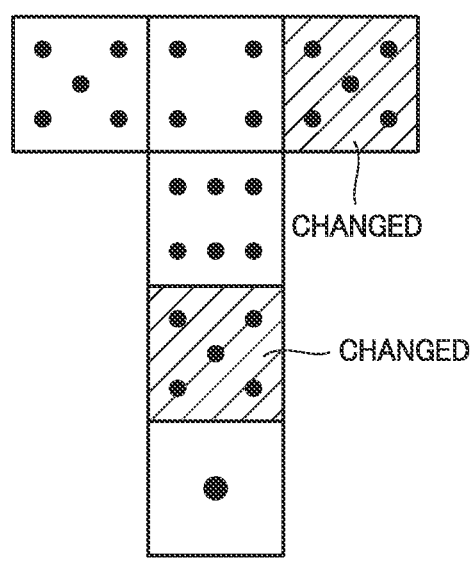

FIG. 12A shows a developed view of a dice used in normal game processing, and FIG. 12B shows a developed view of a dice used in special game processing. FIG. 12B shows an example of a dice used when RF tag 200B3 shown in FIG. 3 is held over an information processing apparatus. As RF tag 200B of the card type is held over an information processing apparatus, a game rule for a dice is changed and game processing progresses advantageously or disadvantageously for a specific player.

Thus, information processing apparatus 100 allows game processing to progress under a first game rule (normal game processing) when the type of RF tag 200 (information storage medium) from which game processing data has been read is identical to the type of RF tag 200 from which the initial registration data has been read, whereas information processing apparatus 100 allows game processing to progress under a second game rule (special game processing) when the type of RF tag 200 from which game processing data has been read is different from the type of RF tag 200 from which the initial registration data has been read.

The first game rule and the second game rule can be set as appropriate in accordance with a feature of a game.

For example, as described above, use of RF tag 200B of the card type is more advantageous than use of RF tag 200A of the figure type from a point of view of increase in probability of showing of a specific pip of a dice. On the other hand, a probability of showing of a pip other than the specific pip of the dice lowers and it is disadvantageous from this point of view.

For example, a bonus can be obtained at some probability when normal game processing is performed with the use of RF tag 200A of the figure type, whereas an opportunity to obtain such a bonus may be abandoned when RF tag 200B of the card type is used. Namely, such a game rule is set that an advantage and a disadvantage are produced in a case that RF tag 200A of the figure type registered in advance is used and in a case that RF tag 200B of the card type which can arbitrarily be selected is used. Then, such a fun can be provided to a user as applying tactics to select which of RF tag 200A of the figure type and RF tag 200B of the card type is to be used, tactics to select timing to use RF tag 200B of the card type, and tactics to select which RF tag 200B of the card type is to be used among a plurality of RF tags 200B of the card type, in accordance with a situation of progress of a game.

Since each player can also obtain one RF tag 200B or a plurality of RF tags 200B of the card type, some restriction may be imposed on use of such RF tag 200B of the card type. For example, only RF tag 200B representing any character registered in advance with some method may be used. Alternatively, only RF tag 200B representing a registered or acquired character may be used in the same game world.

Each RF tag 200B of the card type may be used only once in one game processing. By restricting the number of times of use, each player is required to use more sophisticated tactics and zest of a game can be enhanced. [G. Modification]

Though a method of use in rotation of information processing apparatus 100 by a plurality of players has been exemplified in the embodiment described above, limitation thereto is not intended, and each player may use a player's own information processing apparatus 100. In this case, a specific information processing apparatus 100 may function as a "parent" of information processing apparatuses 100 used by the respective players and each of remaining information processing apparatuses 100 may function as a "child." When a turn to operate comes, each player holds RF tag 200A registered in advance or any RF tag 200B over information processing apparatus 100 of the player himself/herself. Data read from RF tag 200 by each information processing apparatus 100 is collected to information processing apparatus 100 functioning as the parent, in which game processing as described above is performed.

An operation entity which performs game processing as described above does not have to be information processing apparatus 100 used by each player. For example, information processing apparatus 100 used by each player may function as an NFC reader and writer and an input and output device and a server apparatus on a network may perform game processing as described above by using the data collected from each information processing apparatus 100.

[H. Advantages]

According to the present embodiment, for example, when a plurality of information storage media are available, game processing progresses on condition that an information storage medium the same as the information storage medium registered in advance is held over an information processing apparatus. Therefore, when a plurality of players perform game operations in a prescribed order, the game can smoothly progress.

According to the present embodiment, even when the same RF tag 200 is held over an information processing apparatus, processing is different depending on how RF tag 200 is registered and hence new user experiences can also be provided.

According to the present embodiment, game processing can progress with a plurality of types of RF tags 200 being present as mixed and the processing at the time when RF tag 200 is held over an information processing apparatus is different for each type. Therefore, game experiences higher in zest can be provided to a user.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory storage medium encoded with a computer readable game program executed by a computer incorporating a near field radio communication function, the game program comprising instructions causing the computer to perform:
    reading, by establishing near field radio communication with an information storage medium, first data stored in that information storage medium;
    registering the read first data;
    reading, by establishing near field radio communication with an information storage medium after registration of the first data, second data stored in that information storage medium;
    comparing the first data with the second data and progressing game processing when the comparison reveals the second data matches with the first data; and
    progressing game processing when the form factor type of the information storage medium from which the second data has been read is determined to be different from the form factor type of the information storage medium from which the first data has been read, even when the second data does not match with the first data.

2. The non-transitory storage medium according to claim 1, wherein
    progressing game processing includes not progressing the game processing when the second data does not match with the first data.

3. The non-transitory storage medium according to claim 1, wherein
    there are a plurality of form factor types of information storage medium from which data is read through near field radio communication.

4. The non-transitory storage medium according to claim 3, wherein
    progressing game processing includes not progressing the game processing when the form factor type of the information storage medium from which the second data has been read is determined to be identical to the form factor type of the information storage medium from which the first data has been read and when the comparison reveals the second data does not match with the first data.

5. The non-transitory storage medium according to claim 3, wherein
    progressing game processing includes;
        progressing the game processing under a first game rule when the form factor type of the information storage medium from which the second data has been read is determined to be identical to the form factor type of the information storage medium from which the first data has been read, and
        progressing the game processing under a second game rule when the form factor type of the information storage medium from which the second data has been read is determined to be different from the form factor type of the information storage medium from which the first data has been read.

6. The non-transitory storage medium according to claim 1, wherein
    registering the first data includes registering a plurality of pieces of the first data.

7. The non-transitory storage medium according to claim 6, wherein
    registering the first data includes registering the plurality of pieces of the first data in association with respective specific players.

8. The non-transitory storage medium according to claim 7, wherein
    progressing game processing includes comparing one piece of first data selected in a predetermined order from among the plurality of pieces of the registered first data with the read second data.

9. The non-transitory storage medium according to claim 1, wherein
    registering the first data includes registering the first data in association with a specific character, and
    progressing game processing includes controlling a character associated with the first data.

10. The non-transitory storage medium according to claim 9, wherein
    the information storage medium is formed in a shape representing any character, and
    progressing game processing includes controlling a character corresponding to a shape represented by the information storage medium from which the first data has been read.

11. The non-transitory storage medium according to claim 9, wherein
    controlling a character includes displaying the character in a game space.

12. The non-transitory storage medium according to claim 9, wherein
    controlling a character includes moving the character in a game space.

13. The non-transitory storage medium according to claim 9, wherein
    reading second data includes activating data reading from the information storage medium while a character associated with any registered first data is displayed.

14. The non-transitory storage medium according to claim 9, wherein
    reading second data includes activating data reading from the information storage medium while a character associated with any registered first data is controllable.

15. An information processing apparatus, comprising:
    a communication circuit including an antenna configured to exchange data with an information storage medium by establishing near field radio communication with the information storage medium;

a near field communications reader configured to read, by establishing near field radio communication with an information storage medium, first data stored in that information storage medium;

a registration circuit configured to register the first data read by the near field communications reader;

the near field communications reader being further configured to read, by establishing near field radio communication with an information storage medium after registration of the first data, second data stored in that information storage medium; and a process progress processor configured to:
 compare the first data with the second data and progress game processing when the comparison reveals the second data matches with the first data, and
 progress game processing when the form factor type of the information storage medium from which the second data has been read is determined to be different from the form factor type of the information storage medium from which the first data has been read, even when the second data does not match with the first data.

16. An information processing system, comprising:

a communication circuit configured to exchange data with an information storage medium by establishing near field radio communication with the information storage medium; and a processor configured to execute a game program, including
 reading, by establishing near field radio communication with an information storage medium, first data stored in that information storage medium,
 registering the read first data,
 reading, by establishing near field radio communication with an information storage medium after registration of the first data, second data stored in that information storage medium,
 compare the first data with the second data;
 progressing game processing when the comparison reveals the second data matches with the first data; and
 progressing game processing when the form factor type of the information storage medium from which the second data has been read is determined to be different from the form factor type of the information storage medium from which the first data has been read, even when the second data does not match with the first data.

17. A game processing method performed by a computer incorporating a near field radio communication function, comprising the steps of:

reading, by establishing near field radio communication with an information storage medium, first data stored in that information storage medium;

registering the read first data;

reading, by establishing near field radio communication with an information storage medium after registration of the first data, second data stored in that information storage medium;

comparing the first data with the second data;

progressing game processing when the comparison reveals the second data matches with the first data; and progressing game processing when the form factor type of the information storage medium from which the second data has been read is determined to be different from the form factor type of the information storage medium from which the first data has been read, even when the second data does not match with the first data.

* * * * *